United States Patent [19]

Mitsui

[11] Patent Number: 5,100,166
[45] Date of Patent: Mar. 31, 1992

[54] SUSPENSION DEVICE FOR A VEHICLE

[75] Inventor: Junichi Mitsui, Saitama, Japan

[73] Assignee: Tonen Corporation, Tokyo, Japan

[21] Appl. No.: 663,271

[22] Filed: Feb. 28, 1991

Related U.S. Application Data

[63] Continuation-in-part of Ser. No. 530,347, May 30, 1990, abandoned.

[30] Foreign Application Priority Data

May 31, 1989 [JP] Japan ................................. 1-136173

[51] Int. Cl.$^5$ ............................................ B60G 11/26
[52] U.S. Cl. ...................................... 280/707; 188/267; 188/290
[58] Field of Search ................. 280/707; 188/267, 290

[56] References Cited

U.S. PATENT DOCUMENTS

| | | | |
|---|---|---|---|
| 4,869,476 | 9/1989 | Shtarkman | 188/267 |
| 4,896,752 | 1/1990 | Shtarkman | 188/267 |
| 4,942,947 | 7/1990 | Shtarkman | 188/290 |

Primary Examiner—Kenneth R. Rice
Attorney, Agent, or Firm—Michael N. Meller

[57] ABSTRACT

A damper device for a suspension device for a vehicle in which the damping fluid is an electro-viscosity fluid and an electric control unit is provided for controlling the electric field in the electro-viscosity fluid, to thereby control the damping factor of the damper device. A sensor is used for detecting vibration at the wheels, such as an acceleration rate of the suspension device, and the detected vibration is used for controlling the strength of the electric field, to thereby control the damping characteristic of the damper.

3 Claims, 10 Drawing Sheets

SUSPENSION DEVICE FOR A VEHICLE

RELATED APPLICATION

This application is a continuation-in-part application Ser. No. 530,347 filed on May 30, 1990 now abandoned.

BACKGROUND OF THE INVENTION

1. Field of the Invention

The present invention relates to a suspension device for a vehicle.

2. Description of the Related Art

A suspension device in a vehicle, such as an automobile, is usually provided with a shock absorber to prevent the transmission of vibration occurring at the wheels in accordance with road conditions to the vehicle body. Such a shock absorber is usually arranged between the wheel and a vehicle body, and comprises a spring and a damper arranged in a parallel relationship to each other.

In such a type of shock absorber, a shock absorbing operation is controlled by selecting the value of the spring coefficient k of the spring and damping coefficient c of the damper with respect to the value of the weight m of the vehicle, in such a manner that vibration at the wheels is dampened in accordance with damping ratio $\zeta = c/(2\sqrt{mxk})$.

The prior art shock absorber suffers from a drawback in that an adjustment of the damping ratio $\zeta$ after the unit is mounted on the vehicle is difficult, since the spring coefficient k and the damping factor c of the damper have a fixed value obtained when the vehicle is assembled. It should be noted that the damping ratio is not constant and changes with a lapse of time and use, but it has been impossible in the prior art to obtain a damping effect over a wide range of vibration frequencies.

An improved shock absorber has been proposed wherein a damper is provided with a piston defining an orifice(s) having a dimension which can be varied by a drive means such as a stepper motor, so that the damping factor $\zeta$ can be adjusted. This improved device, however, suffers from another drawback in that the construction thereof is complex, and the response speed thereof when controlling the damping factor in accordance with changes in the vibration conditions is slow, and thus it is difficult to obtain a desired damping characteristic during a transient state wherein a damping ratio must be quickly changed in accordance with a lapse of time.

SUMMARY OF THE INVENTION

An object of the present invention is to provide a damping device having a simplified construction, a damping characteristic which is easily adjusted, and having a high speed response by which vibration at the vehicle wheels is quickly suppressed.

According to the present invention, a damper device is provided for a suspension for a vehicle having a body and a wheel, the damper device comprising a first member connected to the body and a second member connected to the wheel, the first and second member being moved relative to each other, first and second chambers being formed between the first and second members and being connected with each other via at least one passageway, an electro-viscosity fluid being filled in the first and second chambers, means for generating an electric field in the fluid flowing through the passageway, means for detecting a parameter representing at least one vibration condition at the wheel, and means responsive to the detected vibration parameter for controlling the strength of the electric field applied for imparting a required damping of vibration transmitted to the vehicle body from the wheel.

DESCRIPTION OF THE PREFERRED EMBODIMENT

Figure 1:
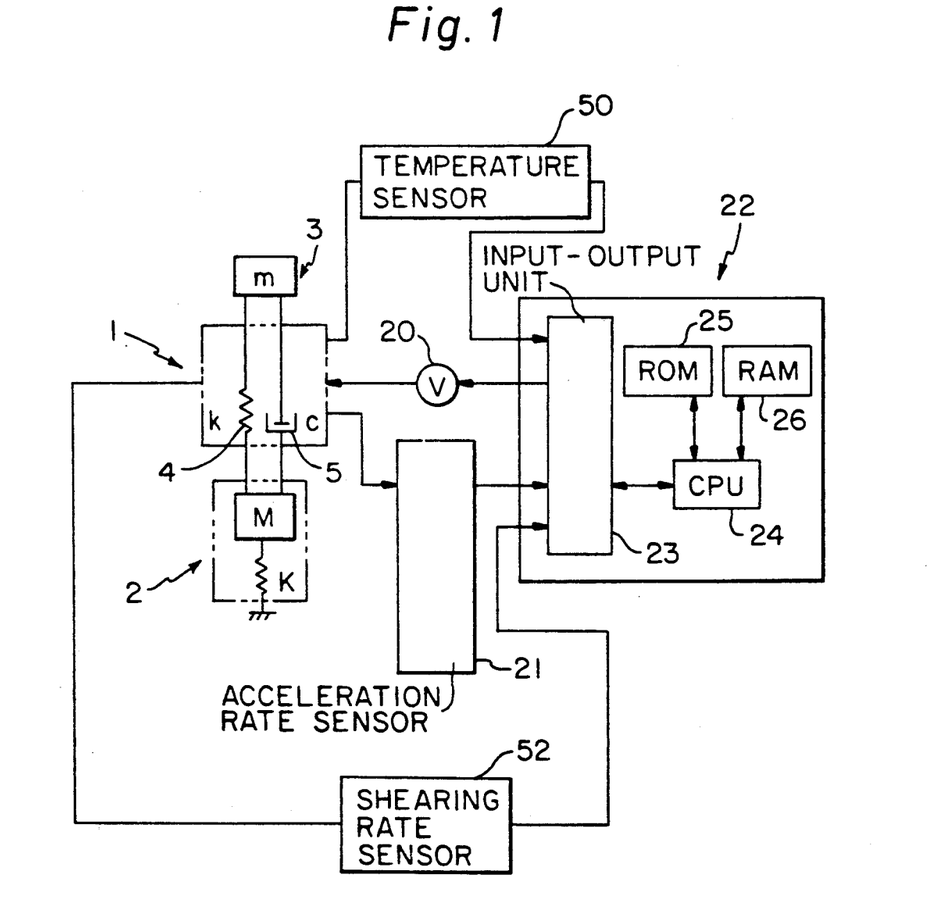
FIG. 1 is a schematic representation of the suspension system according to the present invention.

FIG. 1 is a schematic representation of a suspension device according to the present invention, which is provided with a shock absorber at each of the wheels 2 of a vehicle. The shock absorber 1 is arranged between a wheel 2 as a vibrating body having a mass (main mass) of M and a spring rate of K and a vehicle body 3 having a mass (auxiliary mass) of m. The shock absorber 1 is constructed by a spring k and damper 5 arranged in a parallel relationship to each other.

Figure 2:
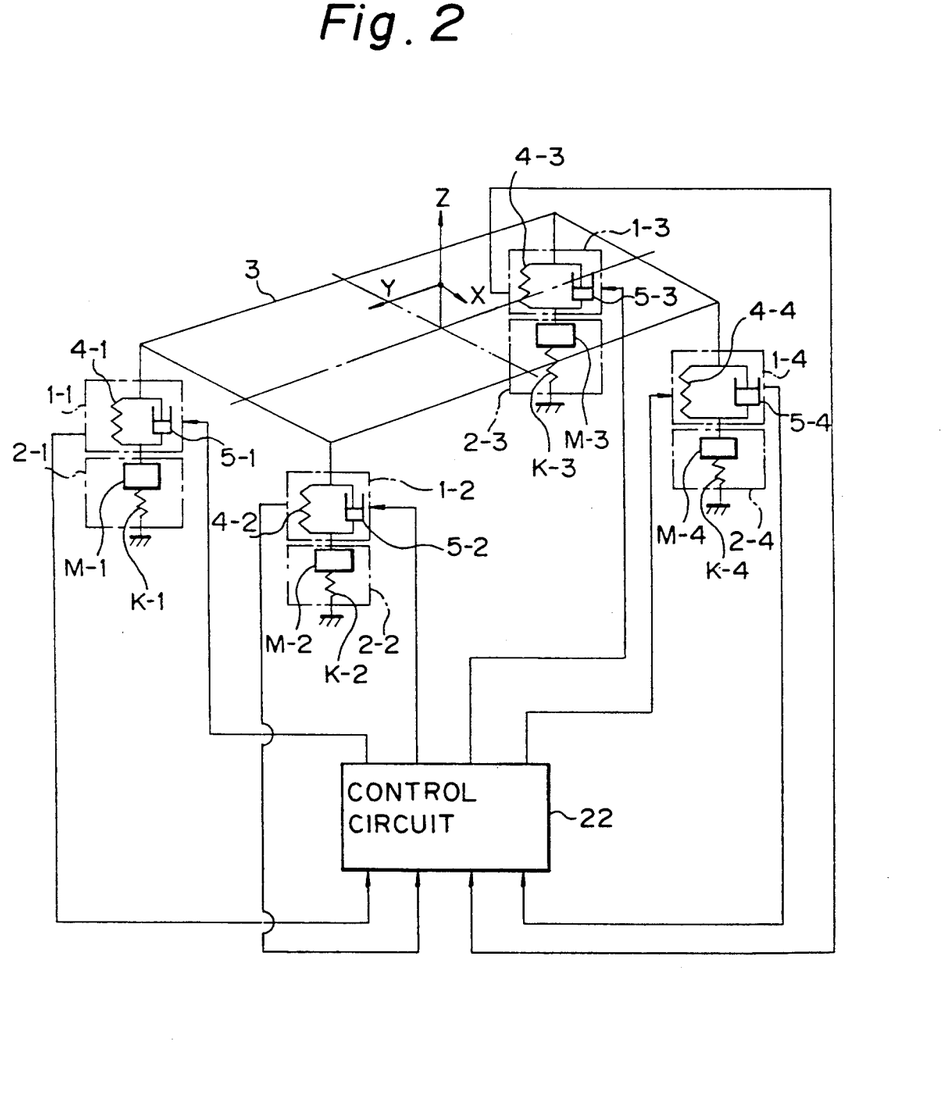
FIG. 2 is a schematic representation of a vehicle provided with a suspension system according to the present invention.

FIG. 2 is a diagrammatic view of a vehicle employing the suspension device shown in FIG. 1. The body 3 is provided with four wheels 2-1, 2-2, 2-3 and 3-4. The wheels 2-1, 2-2, 2-3 and 2-4, each of which has a mass M-1, M-2, M-3, and M-4, respectively, and springs K-1, K-2, K-3 and K-4, are connected to the vehicle body 3 via respective shock absorbers 1-1, 1-2, 1-3, and 1-4. The shock absorbers 1-1, 1-2, 1-3 and 1-4 are constructed by springs 4-1, 4-2, 4-3, and 4-4 and dampers 5-1, 5-2, 5-3, and 5-4, respectively. As will be described later with reference to FIG. 1, the vibration parameters, such as an acceleration rate at each of the wheels 2-1, 2-2, 2-3, and 2-4 are independently detected by respective sensors (21 in FIG. 1), and the control circuit 22 outputs signals to the dampers 5-1, 5-2, 5-3, and 5-4 of the shock absorbers 1-1, 1-2, 1-3, and 1-4, respectively, for controlling the damping characteristic of the respective dampers.

Figure 3:
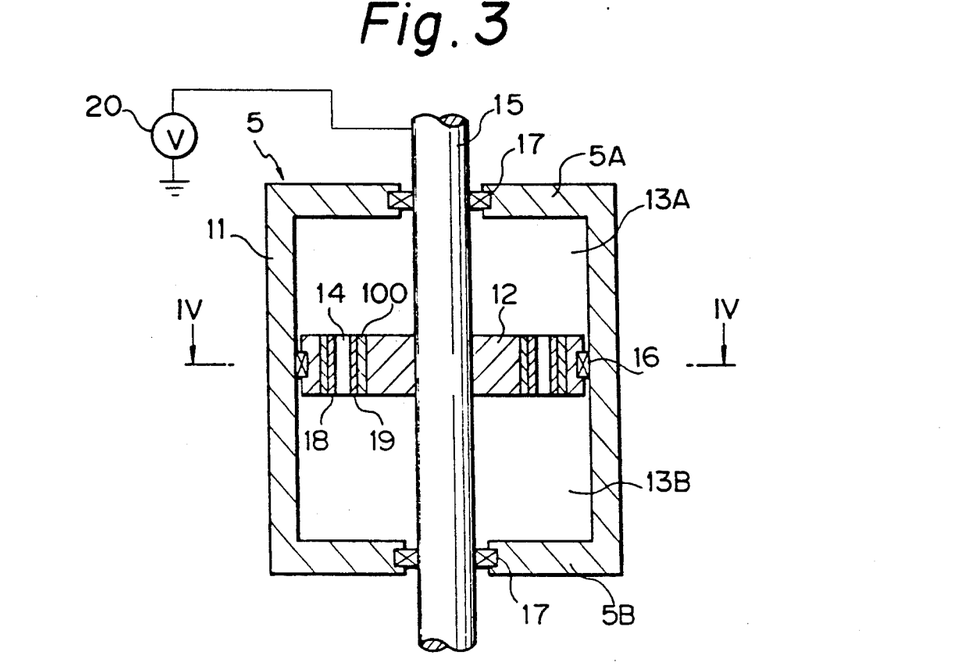
FIG. 3 is a longitudinal cross-sectional view of the damper shown in FIG. 1 or 2.
Figure 4:
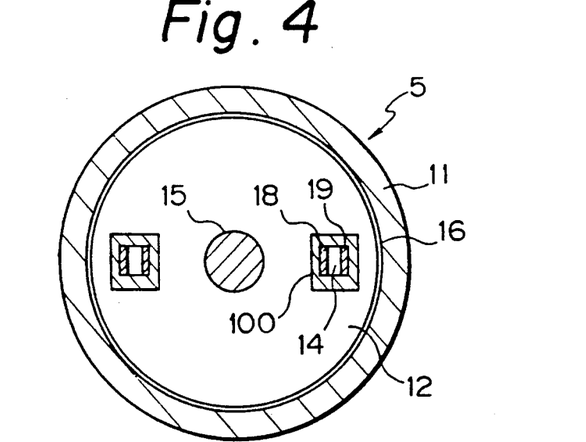
FIG. 4 is a transverse cross-sectional view taken along the line IV—IV in FIG. 3.

The damper 5 or 5-1 to 5-4 in FIGS. 1 and 2 of the shock absorber 1 or 1-1 to 1-4 has a construction as shown, for example, in FIGS. 3 and 4. The damper 5 has a cylindrical damper casing 11, and a piston 12 arranged in the damper case 11 in such a manner that fluid chambers 13A and 13B are formed on the upper and lower sides of the piston 12, respectively, in the casing 11. The piston 12 has openings defining passageways 14 having a rectangular shape, for connecting the chambers 13A and 13B. An operating shaft 15 is fixedly connected to the piston 12 and extends axially out of axial end walls 5A and 5B, respectively, of the casing 5. An annular seal ring 16 is fixed along the outer periphery of the piston 12, and thus the piston 12 is slidable against the inner surface of the casing 5 but the fluid cannot pass through a clearance between the inner surface of the casing 5 and the outer periphery of the piston 12. Seal rings 17 are fixed to inner surface of openings in the end walls 5A and 5B of the casings through which the shaft 15 is inserted, to seal the oil in the chambers 13A and 13B, respectively.

The damper 5 is further provided with pairs of facing electrodes 18 and 19 provided for each respective communication passageway 14. The electrodes 18 and 19 in each pair are fixed, via respective insulation members 100, on facing inner surfaces of the opening defining each respective passageway 14, and an electric-viscosity fluid, i.e., Winslow fluid, is charged in the space inside the casing 5.

It should be noted that, in addition to or in place of the opposing electrodes 18 and 19 on the facing inner surfaces of the passageway 14 of the piston 12, a tubular slit can be formed between the inner surface of the damper case 11 and the outer surface of the piston 12, for communicating the chambers 13A and 13B with each other, and electrodes facing each other can be formed on the inner surface of the casing 11 and the outer surface of the piston 12, via the tubular slit.

An electric power supply 20 is connected to the electrodes 18 and 19, so that an electric voltage can be applied across the facing electrodes 18 and 19. The shaft 15 is provided therein with an electric wire system (not shown) for obtaining an electrical connection between the electric power supply and the electrodes 18 and 19. It should be noted that the electric power supply device 20 can be mounted in the piston 12 or at the operating shaft 15.

The arrangement of the damper 5 having the above-mentioned construction, wherein the facing electrodes 18 and 19 are arranged on facing inner surfaces of the connection passageway 14 and the electro-viscosity fluid is provided for obtaining the Winslow effect inside the damper casing 11, allows an electric field to be created which has a direction transverse to the direction of the fluid flow from the chamber 13A to the chamber 13B, or vice versa, and thus the viscosity of the electro-viscosity fluid located between the facing electrodes 18 and 19 can be changed. This control of the viscosity of the fluid passing through the connection passageway 14 allows the throttling resistance of the fluid in the connection passageway 14 to be controlled, and thus allows the damping ratio $\zeta$ of the damper to be controlled.

As shown in FIG. 1, the suspension device according to the present invention is provided with a device 21 for detecting vibration generated at each of the suspension device 1, and a control circuit 22 such as a microcomputer unit 22. The control circuit 22 comprises an input-output unit 23, CPU 24, ROM 25, and RAM 26.

A temperature sensor 50 is connected to the damper for detecting the temperature of the electro-viscosity fluid. A sensor 52 is also provided for detection of the shearing rate of the damper fluid by detecting, for example, a speed of change in the volume in a damper chamber 13A or 13B.

The operation of the suspension device will now be described.

Figure 5:
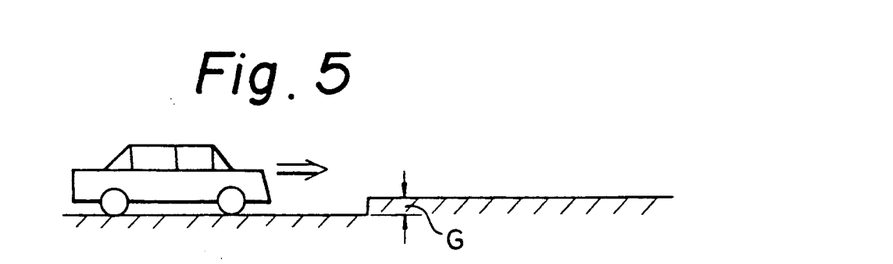
FIG. 5 illustrates a road condition whereby a simulation of the operation of the suspension of the present invention is carried out.

The vibration detecting device 21, which detects vibration at each of the suspensions 1, is constructed by a first sensor for detecting a rate of acceleration or speed or displacement of each of the wheels in a vertical direction Z (FIG. 2), a second sensor for detecting a rate of acceleration or speed or displacement of each of the wheels in a transverse direction X, with respect to the direction of the movement of the vehicle, and a third sensor for detecting a rate of acceleration or speed or displacement of each of the wheels in a direction Y parallel to the direction of the movement of the vehicle. Assuming that the vehicle wheels collide with a step-like portion G on a road surface, as shown in FIG. 5, the vibration detector device 21 detects the vibration, and thus an acceleration, as shown in FIG. 6, with a lapse of time can be obtained.

Figure 6:
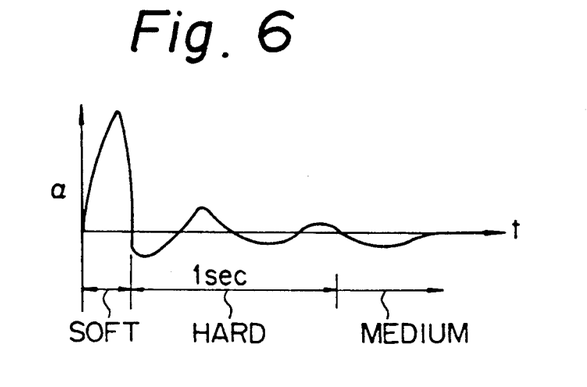
FIG. 6 shows an example of a control of the damping factor in accordance with a degree of acceleration.
Figure 7:
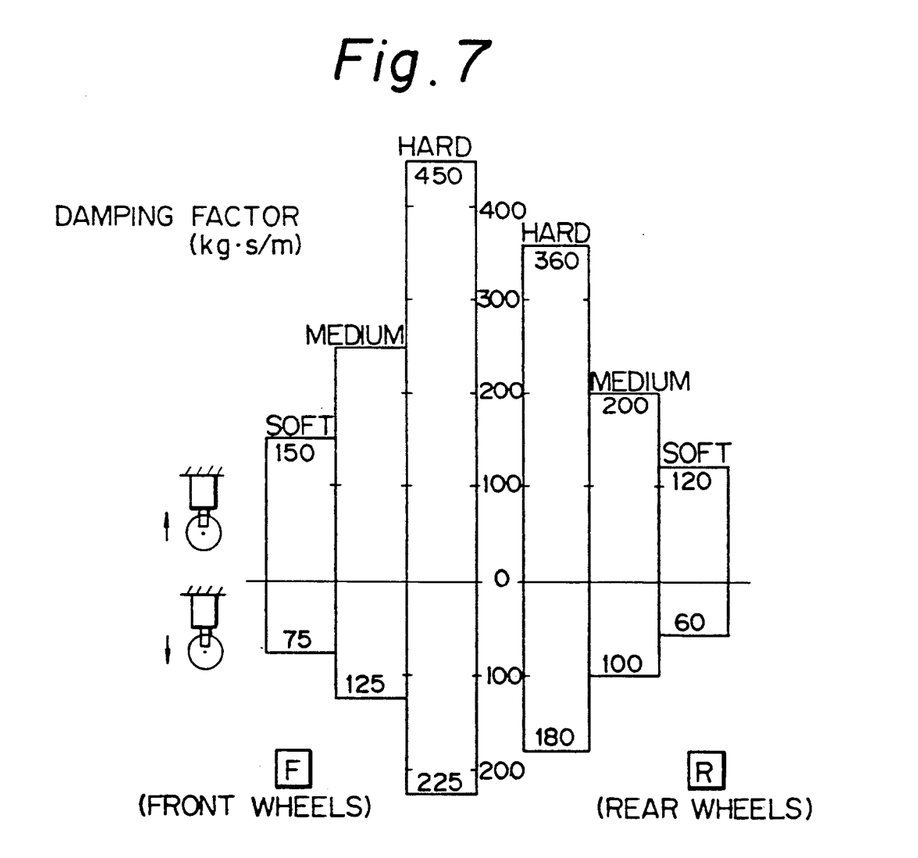
FIG. 7 shows a setting of the damping factors of front and rear wheels of the vehicle.

In an example, the control circuit 22 is provided with a predetermined setting of the damping factor c of the damper 5, as shown in FIGS. 6 and 7, necessary to obtain a damping ratio $\zeta$ of the shock absorber 1 for controlling vibration of the vehicle. As shown in FIG. 6, the damping factor c of the damper 5 of each shock absorber 1 has (a) a low level (SOFT) just before the occurrence of an undulation of the road surface, (b) a high level (HARD) for one second after the acceleration rate has once attained the peak value, and (c) a medium level (MEDIUM) after the period (b). Furthermore, as shown in FIG. 7, different values of each of the low, medium and high levels of the damping factor c are set for the front wheels and the rear wheels, and different values of each of the low, medium and high levels of the damping factor c are set for the state wherein the wheel travels upward and the state wherein the wheel travels downward. For example, in FIG. 7, the damping factor c during the upward travel of the front wheel has a value of 150 (kg·s/m) corresponding to a low (SOFT) level damping factor, a value of 250 (kg·s/m) corresponding to a medium (MEDIUM) level damping factor, and a value of 450 (kg·s/m) corresponding to a high level (HARD) damping factor. The damping factor c during the downward travel of the front wheel has a value of 75 (kg·s/m) corresponding to a low level (SOFT) damping factor, a value of 125 (kg·s/m) corresponding to a medium (MEDIUM) level damping factor, and a value of 225 (kg·s/m) corresponding to a high level (HARD) damping factor.

The control circuit 22 receives a signal from the vibration detecting device 21, calculates the values of the damping factor c of each of the dampers 5 which correspond to the vibration at each of the wheels 2, which corresponds to the degree of acceleration $a$, and calculates the value of the electric voltage V to be applied to the electrodes 18 and 19 for obtaining the calculated damping factor c. The control circuit 22 then outputs a signal at a calculated electric voltage level V to the electric voltage applying device 20, and the device 20 applies this voltage V to the electrodes 18 and 19 of the damper 5 to obtain a value of the damping factor c, i.e., damping ratio, which matches the vibration condition ($\omega$) at each of the wheels 2.

Figure 8A:
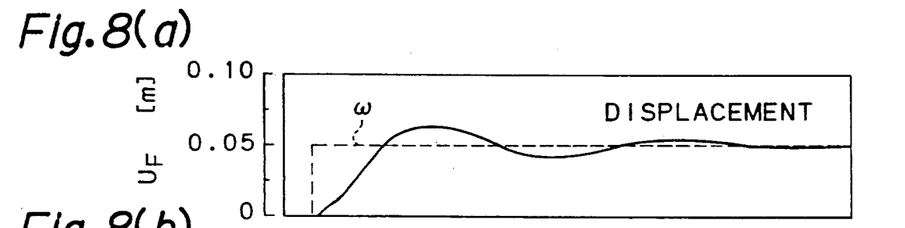
FIGS. 8(a), (b), (c) and (d) illustrate an example of displacement, velocity, acceleration rate, and damping factor, respectively, in a simulation of the suspension system when a step-like displacement is applied thereto.
Figure 8B:
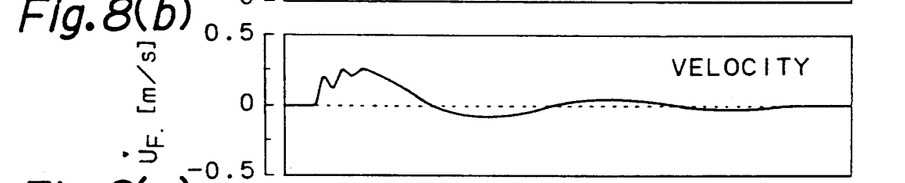
Figures 8C, 8D:
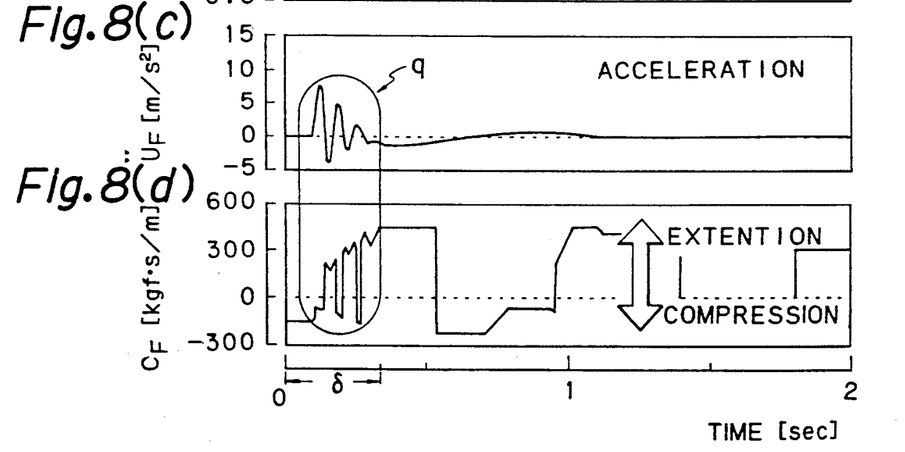

Another example of the setting of the damper 5 according to the present invention will be explained with reference to FIGS. 8(a) to (d), which show the results of a simulation when a step-like displacement, as shown by a step-like displacement w in FIG. 8(a), is encountered by the suspension of the present invention. At the instant of the commencement of the step-like displacement, an acceleration as shown by FIG. 8(c) is detected by the acceleration sensor, such as the sensor 21 in FIG. 1, and the damping factor of the damper 5 of the wheel is controlled as shown by FIG. 8(c). A portion circled by c in FIGS. 8(c) and 8(d) is shown on an enlarged scale by FIGS. 9(a) and (b), respectively.

Figure 10:
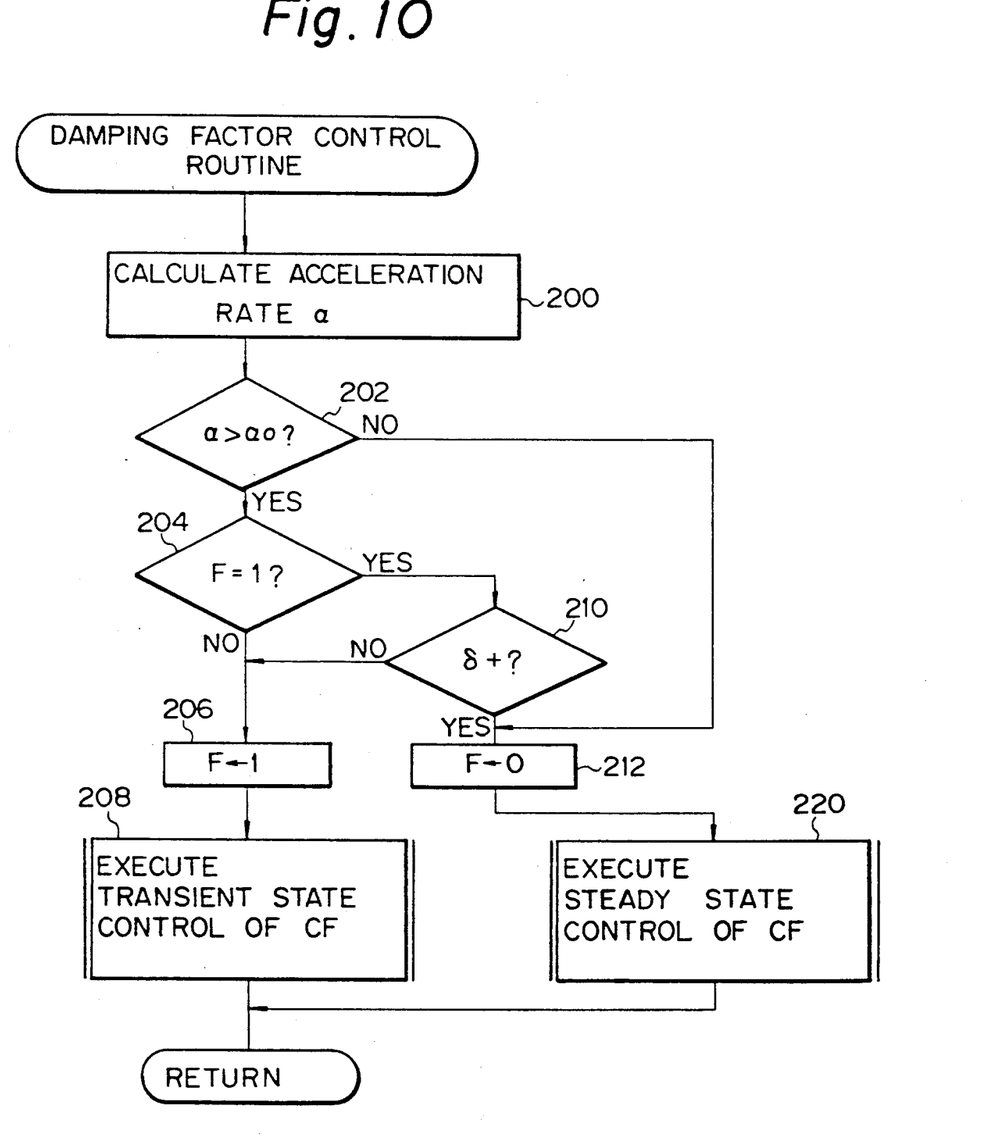
FIG. 10 is a flowchart illustrating an initial stage control of the damping factor in accordance with the degree of acceleration applied to the suspension from the wheel.

An outline of the control of the damping factor is shown in a flowchart in FIG. 10. At step 200, an acceleration rate $\alpha$ is detected, and at step 202, it is determined whether or not acceleration rate $\alpha$ as detected is higher than a threshold value. When it is determined that the detected acceleration rate $\alpha$ is higher than the threshold value, the routine goes to step 204 and it is determined if a flag F is set. When it is determined that the flag F is not set, the routine goes to step 206 and the flag F is set. Then, at step 208, a transient state control of the damping factor is carried out.

When it is determined that the flag $F=1$, the routine goes to step 210 if a predetermined time has lapsed from the start of the transient control of the damping factor. If it is determined that the predetermined time has not lapsed, the routine returns to the step 206. When it is determined that the predetermined time has lapsed, the routine goes to step 212 to clear the flag F, and then to step 220 to execute the control of the damping factor for the steady state condition.

Figure 11:
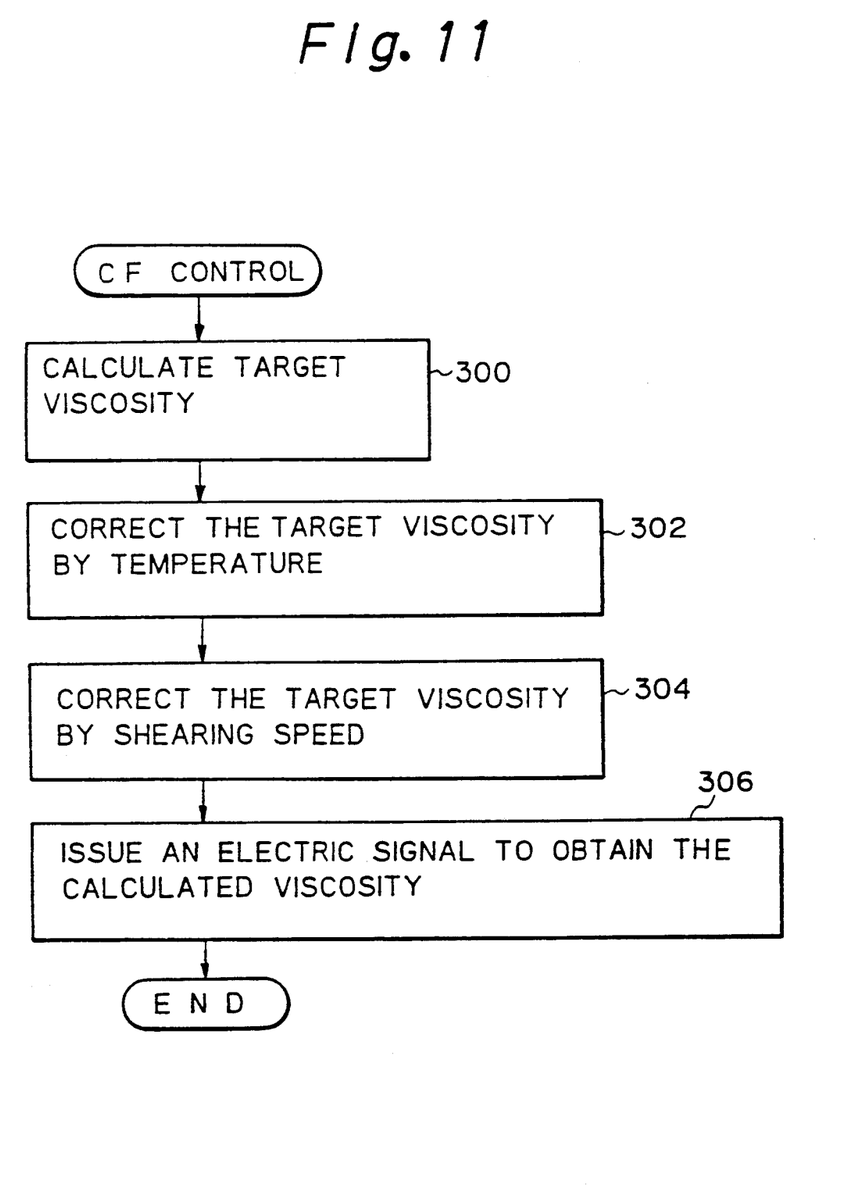
FIG. 11 shows the details of the routine for obtaining the damping factor CF.

FIG. 11 shows, in more detail, a routine for controlling the damping factor CF at step 208 or 220 in FIG. 10. At step 300, a target viscosity of the electro-viscosity fluid passed through the orifice 14 is calculated. This step obtains a target value of the viscosity of the electro-viscosity fluid which matches the running condition of the vehicle, including an acceleration rate of the vehicle, to obtain an ideal damping effect of the vehicle.

Figure 12:
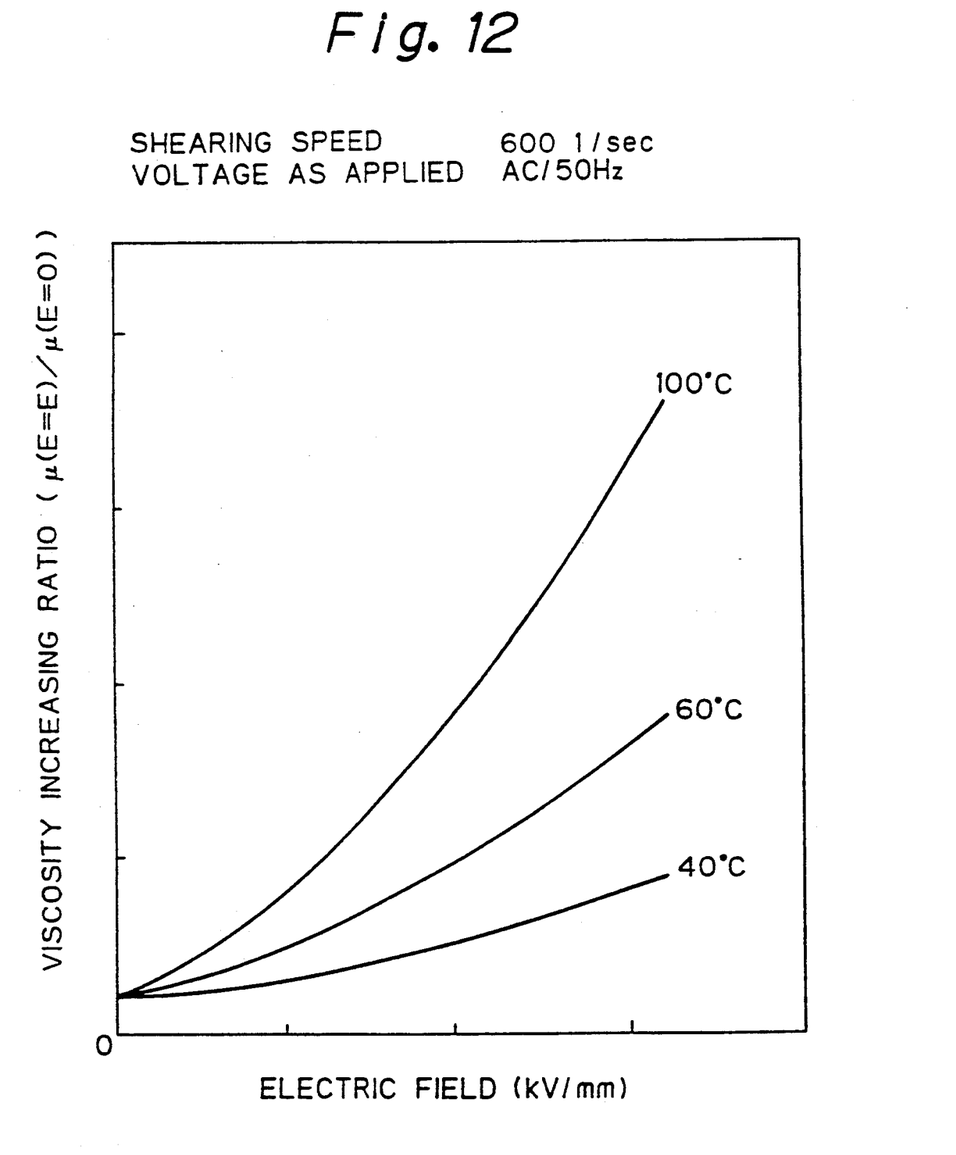
FIGS. 12 and 13 show the relationship between the magnitude of the electric field and the viscosity increasing rate with respect to different values of the temperature of the fluid and the shearing speed, respectively.

At step 302, a correction of the target viscosity is made in accordance with the temperature of the electro-viscosity fluid. FIG. 12 shows the relationship between the electric field and a viscosity increasing ration, with respect to three different values of the temperature of the fluid. As will be easily seen from FIG. 12, the viscosity is influenced by the temperature. Namely, if no correction is applied, a desired viscosity of the electro-viscosity fluid cannot be obtained. At step 302, a correction of the target viscosity obtained at the step 300 is carried out in accordance with the detected temperature of the electro-viscosity fluid by, for example, multiplying the target value obtained at the step 300 by a correction factor.

Figure 13:
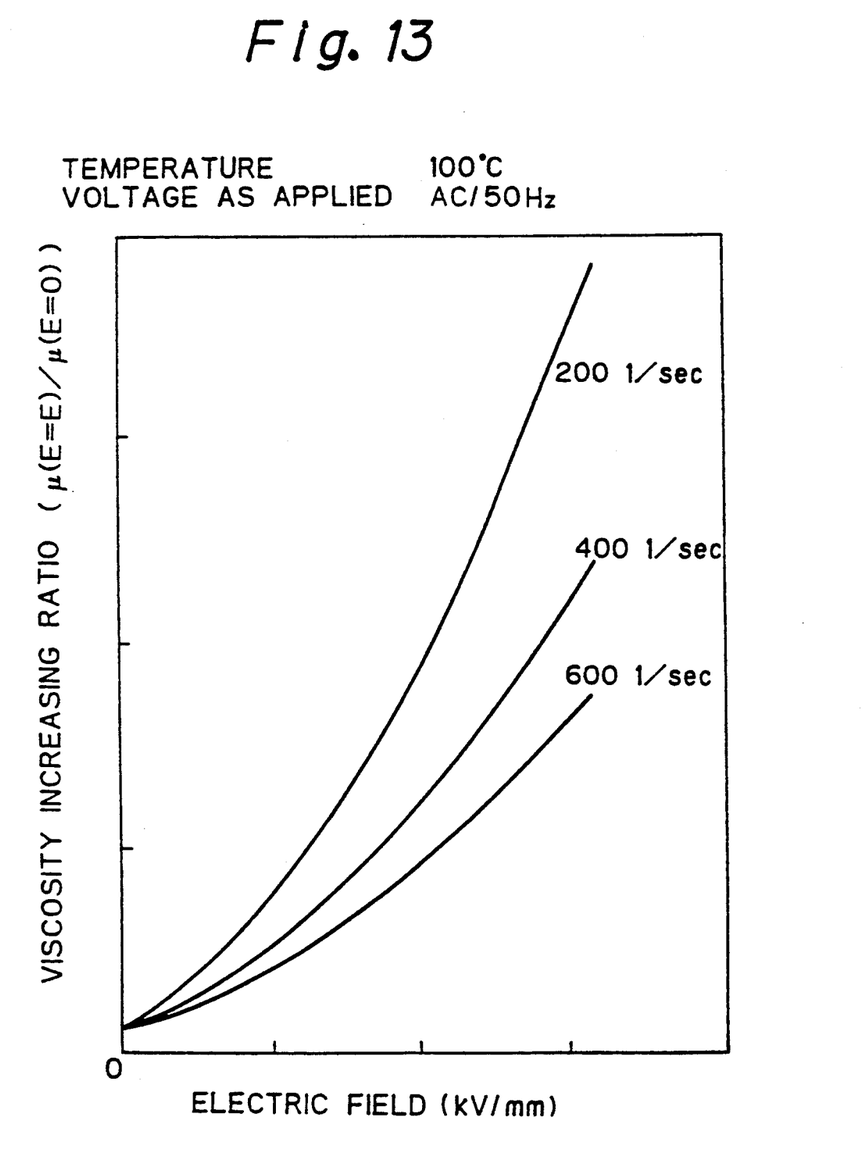

At step 304, a correction of the target viscosity is made in accordance with the shearing rate of damping fluid detected, for example, a relative speed of the piston with respect to the cylinder. FIG. 13 shows the relationship between the electric field and a viscosity increasing ratio, with respect to three values of the shearing speed of the damper, i.e., speed of change in the volume of a damper chamber (1/sec). As easily seen from FIG. 13, the viscosity if influenced by the shearing speed. Therefore, as for the temperature of the fluid, if no correction is applied, a desired damping characteristic cannot be obtained. At step 304, a correction of the target viscosity obtained at step 300 is carried out in accordance with the detected shearing speed by, for example, multiplying the target value temperature corrected at step 302 by a correction factor.

At step 306, an electric signal is applied to the electrodes 18 and 19 for obtaining the viscosity at the orifice 14 as calculated and corrected, so that a desired damping ratio CF is obtained for the damper of the vehicle. It should be noted that the correction of the target viscosity can obtain a desired damping characteristic for the vehicle.

Figure 9A:
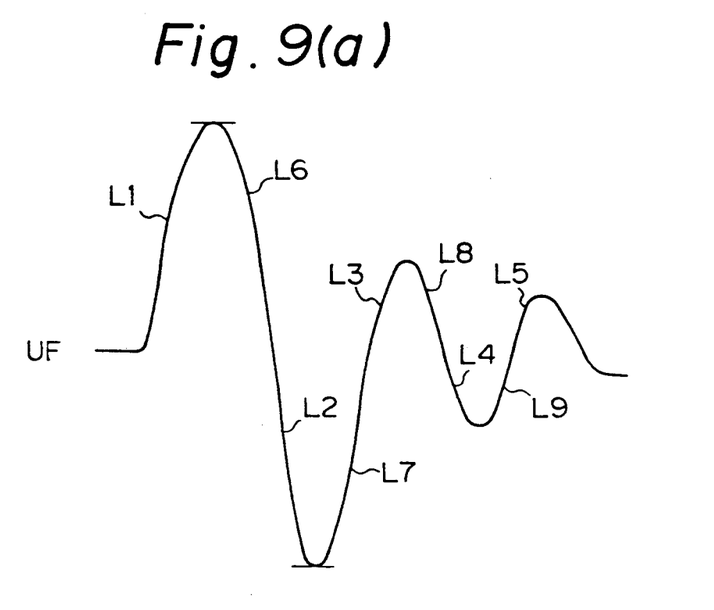
FIGS. 9(a) and 9(b) are enlarged views of FIG. 8(c) and (d), respectively, at portions circled therein.
Figure 9B:
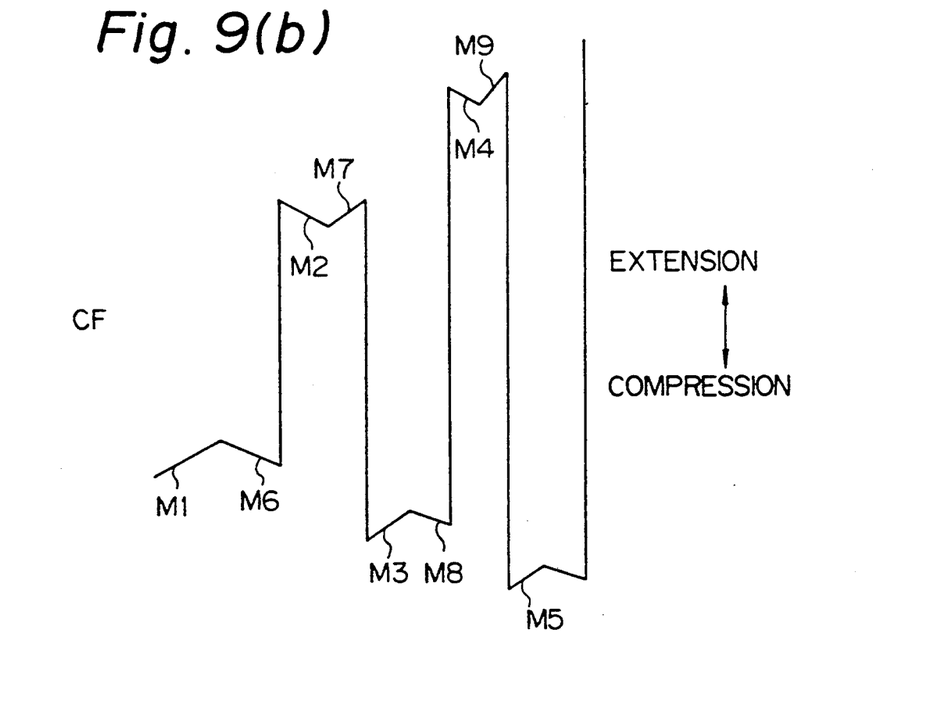

FIGS. 9(a) and (b) illustrate an example of the control of the damping factor during the transient state. The control of the damping factor is such that a positive value of the acceleration rate $\alpha$ gives the damping factor a compression side value, and a negative value of the acceleration rate $\alpha$ gives the damping factor an extension side value. When the value of the acceleration rate $\alpha$ is changed from zero to a extreme value as shown by lines $1_1$, $1_2$, $1_3$, and $1_4$ in FIG. 9(a), the value of the damping factor is lowered as shown by lines $m_1$, $m_2$, $m_3$, and $m_4$ in FIG. 9(b). Conversely, when the value of the acceleration rate $\alpha$ is changed from an extreme value to zero, as shown by lines $1_6$, $1_7$, $1_8$, and $1_9$ in FIG. 9(a), the value of the damping factor is raised as shown by lines $m_6$, $m_7$, $m_8$, and $m_9$ in FIG. 9(b). Note, the more time that has lapsed, the higher the value of the damping factor.

The steady state control at step 220 is shown in FIG. 10 after the initial time $\delta$ (FIG. 8(d) has lapsed. In this area, the damping factor is changed between the hard value at the extension side and at the compression side, in accordance with the velocity.

This control of the damping factor whereby, at the initial stage the damping factor is controlled in accordance with the acceleration rate $\alpha$, and at the later stage, the damping factor is fixed at a high or hard value, allows the displacement, velocity and acceleration to be quickly reduced while maintaining a soft shock absorbing operation at the initial stage and increasing the speed of the damping response.

What is claimed is:

1. A damper device for a suspension device for a vehicle having a body and wheel, said damper device comprising:
    a first member connected to the body,
    a second member connected to the wheel,
    said first and second members being moved relative to each other,
    first and second chambers formed between said first and second members, said first and second chambers being connected to each other via at least one passageway,
    an electro-viscosity fluid contained in said first and second chambers,
    means for detecting a vibration parameter representing at least one vibration condition at the wheel,
    means responsive to said detected vibration parameter for calculating a target viscosity of the electro-viscosity fluid passing through said at least one passageway for obtaining a desired damping characteristic of the vibration transmitted to the vehicle body from the wheel,
    means for detecting a temperature of the electro-viscosity fluid, means for correcting said target viscosity of the fluid in accordance said detected temperature, and, means for controlling the strength of the electric field at said at least one passageway so that said corrected target viscosity is obtained.

2. A damper device according to claim 1, further comprising a sensor for detecting a shearing rate of the damping fluid, and means for further correcting said target viscosity in accordance with said detected shearing rate.

3. A damper device according to claim 1, wherein said parameter detection means comprises a sensor for detecting an acceleration rate generated in the vehicle, and said target velocity calculating means calculates said target velocity in accordance with said detected acceleration rate.

* * * * *